United States Patent [19]

Yoshida et al.

[11] Patent Number: 5,467,272
[45] Date of Patent: Nov. 14, 1995

[54] INTEGRATED WIRING SYSTEM

[75] Inventors: Tatsuya Yoshida; Shigeru Oho, both of Ibaraki, Japan

[73] Assignee: Hitachi, Ltd., Japan

[21] Appl. No.: 184,443

[22] Filed: Jan. 21, 1994

[30] Foreign Application Priority Data

Jan. 21, 1993 [JP] Japan .................................. 5-008079

[51] Int. Cl.$^6$ .................................................. G06F 15/80
[52] U.S. Cl. ................. 364/424.01; 364/424.03; 364/431.04; 364/431.07
[58] Field of Search ................. 364/424.01, 424.03, 364/424.1, 431.04, 431.07, 514; 340/825.02, 825.06, 825.07, 825.52; 370/91, 95.3, 84; 395/200

[56] References Cited

U.S. PATENT DOCUMENTS

| | | | |
|---|---|---|---|
| 4,924,391 | 5/1990 | Hirano et al. ...................... | 364/424.03 |
| 4,949,083 | 8/1990 | Hirabayashi et al. ............. | 340/825.05 |
| 5,053,964 | 10/1991 | Mister et al. ...................... | 364/424.01 |
| 5,284,116 | 2/1994 | Richeson, Jr. ..................... | 123/425 |

*Primary Examiner*—Kevin J. Teska
*Assistant Examiner*—Susan Wieland
*Attorney, Agent, or Firm*—Evenson, McKeown, Edwards & Lenahan

[57] ABSTRACT

An integrated wiring system having a plurality of terminal control units and a central controlling unit (including computational processing means) for transferring information to and from the terminal control units. An input/output control unit is provided for executing communication control based on plural communication protocols with a plurality of different information processing speeds for communicating with the terminal control units. In a preferred embodiment, the input/output control units have a plurality of transmission controlling programs corresponding to the plurality of terminal control units, and the frequencies of execution of the respective terminal controlling programs are different from one another.

16 Claims, 4 Drawing Sheets

INTEGRATED WIRING SYSTEM

BACKGROUND AND SUMMARY OF THE INVENTION

The present invention relates to an integrated wiring system, and more particularly to an integrated wiring system suitable for controlling devices provided in an automobile.

In an automobile, it is necessary to perform various kinds of control, such as high-speed control (1 ms to 10 ms) and low-speed control (10 ms to 100 ms). Typical examples of systems which require high-speed control and processing of a large amount of information are ignition timing and fuel injection for an internal combustion engine. A typical example of low-speed control is control for electrical parts (such as a head lamp, a seat motor and a power window), which merely requires processing of a small amount of information.

Japanese Patent Laid-Open No. 230345/1984 discloses an integrated wiring system for controlling radio devices by performing serial multiplex data transmission of control signals over one or several signal transmission lines which are substituted for a multiplicity of control signal wires. However, in such arrangement, if various kinds of control are to be handled by a single communication protocol, a high-speed communication protocol must be employed, and it is thus necessary to apply high-speed information processing not only to tasks which require the high-speed information processing, but also to tasks which can be processed by low-speed information processing as well. Even if different communication ICs are provided for handling a plurality of communication protocols, if the communication ICs are separately controlled, it is impossible to fully simplify the entire wiring.

An object of the present invention therefore is to provide an integrated wiring system capable of flexibly coping with various communication systems.

SUMMARY OF THE INVENTION

These and other objects and advantages are achieved according to the invention by providing an integrated wiring system having a plurality of terminal control units, and a central control unit (including computational processing means) for transferring information to and from the terminal control units. An input/output control unit is provided for executing communication control based on plural communication protocols with a plurality of different information processing speeds for communicating with the terminal control units.

In a preferred embodiment, the input/output control units have a plurality of transmission controlling programs corresponding to the plurality of terminal control units, and the frequencies of execution of the respective terminal controlling programs are different from one another. That is, high speed systems (such as, for example, engine ignition control) are evaluated and controlled more frequently than low speed systems (such as door locks, etc.).

Because the input/output control unit of the central control unit is arranged to be capable of executing various communication protocols, it is possible to communicate flexibly and efficiently with various terminal control units.

Other objects, advantages and novel features of the present invention will become apparent from the following detailed description of the invention when considered in conjunction with the accompanying drawings.

DETAILED DESCRIPTION OF THE EMBODIMENTS

Figure 1:
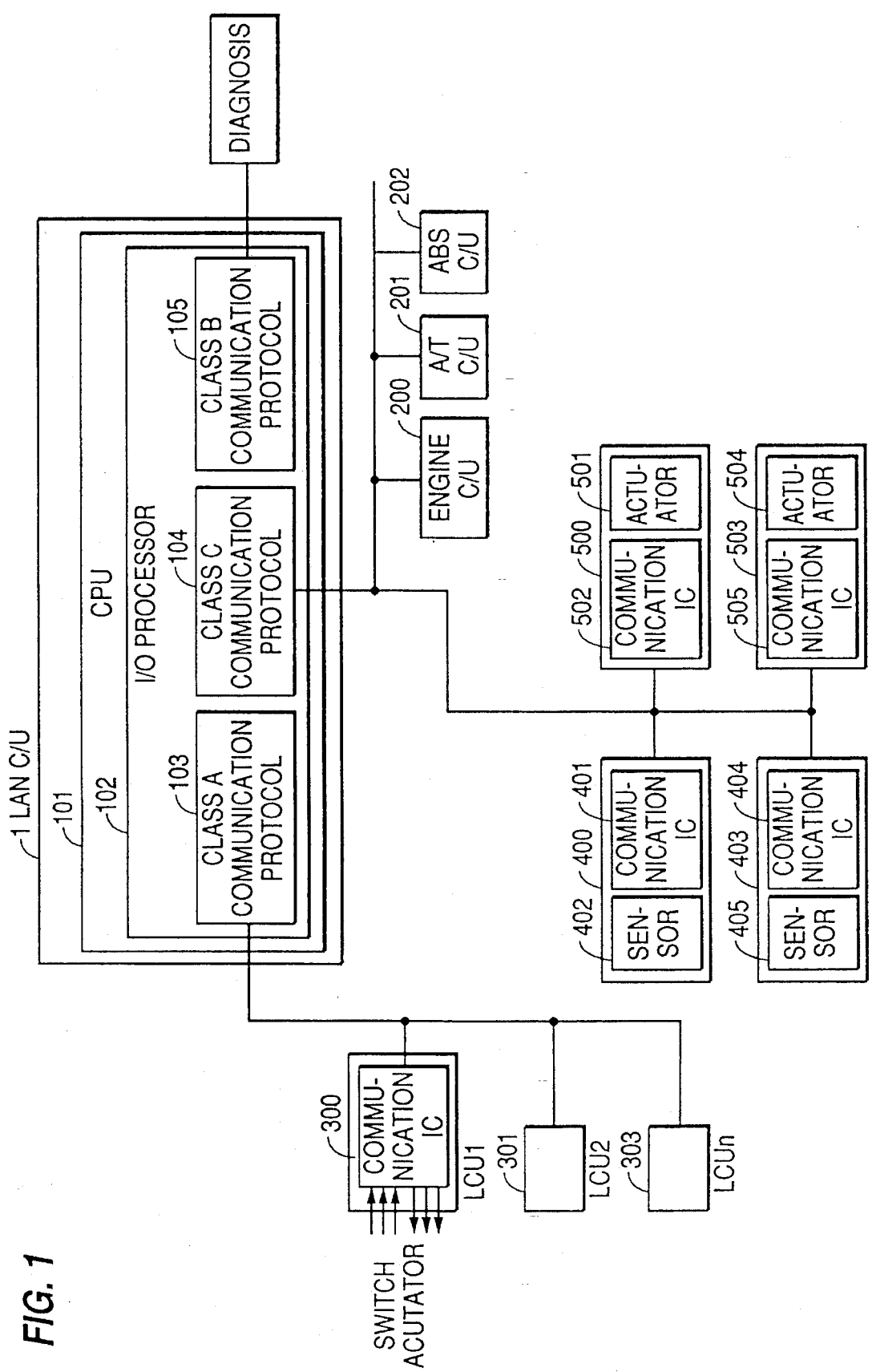
FIG. 1 shows one embodiment of an integrated wiring system according to the present invention.

FIG. 1 shows one embodiment of an integrated data transmission system according to the present invention, in which control units perform various control computations, such as a LAN control unit 100 which serves as a central station for performing centralized management of all information. An engine control unit (hereinafter referred to as the "engine c/u") 200 performs control computations on the ignition timing, fuel injection and the like of an internal combustion engine, while an automatic transmission control unit (hereinafter referred to as the "A/T c/u") 201 controls speed change of a transmission, and an anti-lock braking system control unit (hereinafter referred to as the "ABS c/u") 202 controls the brakes. The integrated wiring system also includes sensors 400, 403 and so on for detecting various parameters (for example, an intake air sensor for detecting the amount of intake air to the engine, a revolution sensor for detecting the speed of the engine, and a wheel speed sensor). Actuators 500, 503 (for example, ignition plug, fuel injection valve and hydraulic actuators) and so on are responsive to the results of computations performed by the control units on the basis of information supplied from the various sensors, and local control units (hereinafter referred to as the "LCUs") 301 to 303 are terminal stations which utilize low-speed information processing.

The LAN c/u 100 has low-speed (Class A), medium speed (Class B) and high-speed (Class C) communication units 103 to 105, respectively, which are centrally managed by a CPU 101, and by which it transmits and receives all information. Computations for Class A controls are performed by the CPU 101, and the LAN c/u 100 controls the actuators of the LCUs based on the results of the computations. A plurality of LCUs, each having a communications IC are coupled with actuator switches (for example, power window switches, lamp switches and a door opening/closing switch located nearby), and actuators such as electrical parts (for example, a power window motor, a head lamp, a room lamp and a-door lock motor). The LCU's detect information concerning the status of such systems, and carry out commands generated by the CPU 101 based on such information.

In performing Class A control, the LAN c/u 100 communicates sequentially with the LCUs 1 to n via the Class A communication interface 103. It receives input switch information from each of the LCUs, performs computations on on/off information about the actuator outputs of the LCUs 1 to n on the basis of various input conditions, and transmits the obtained on/off information to each of the LCUs. For example, the LAN c/u receives information indicating that a switch monitored by the LCU 1 has been turned on, performs computations on the basis of that information; and transmits a command to operate an appropriate actuator controlled by the LCU 2. During actual transmission and reception, the LAN c/u 100 sequentially accesses each of the LCUs, and the received data is stored in an input table in a memory (RAM), while data to be transmitted is stored in an output table in the RAM. The CPU performs computations using the information stored in the input table, and stores the result in the output table.

In a Class C (high-speed) control method, on the other hand, each of the sensors 400, 403, etc. has a sensor part 402,405 and a communication IC 401, 404. The signal from the sensor is digitized and information is communicated to each control device through a communication line. Each of the control units, that is the LAN c/u 100, the engine c/u 200, the A/T c/u 201, the ABS c/u 202 and the like has a computing unit (CPU), which has a Class C communication device by which it receives information at high speed from various sensors, including for example, sensors 400,403. Not only the communication line but also sensors and switches (which are located near the control units), as well as the actuators are connected to each of the control units. Each of the control units performs various computations on the basis of such information and transmits on/off information to the actuators. Each actuator has a communication IC, and each of the actuators is turned on/off in accordance with the transmitted on/off information.

Class B control is utilized to control systems which require intermediate processing speed, such as engine failure diagnostic systems, external diagnostic systems and the like. Such control is performed similarly to the Class A and Class C controls described above, by means of the communications subprocessor of FIG. 3, described below.

Figure 2:
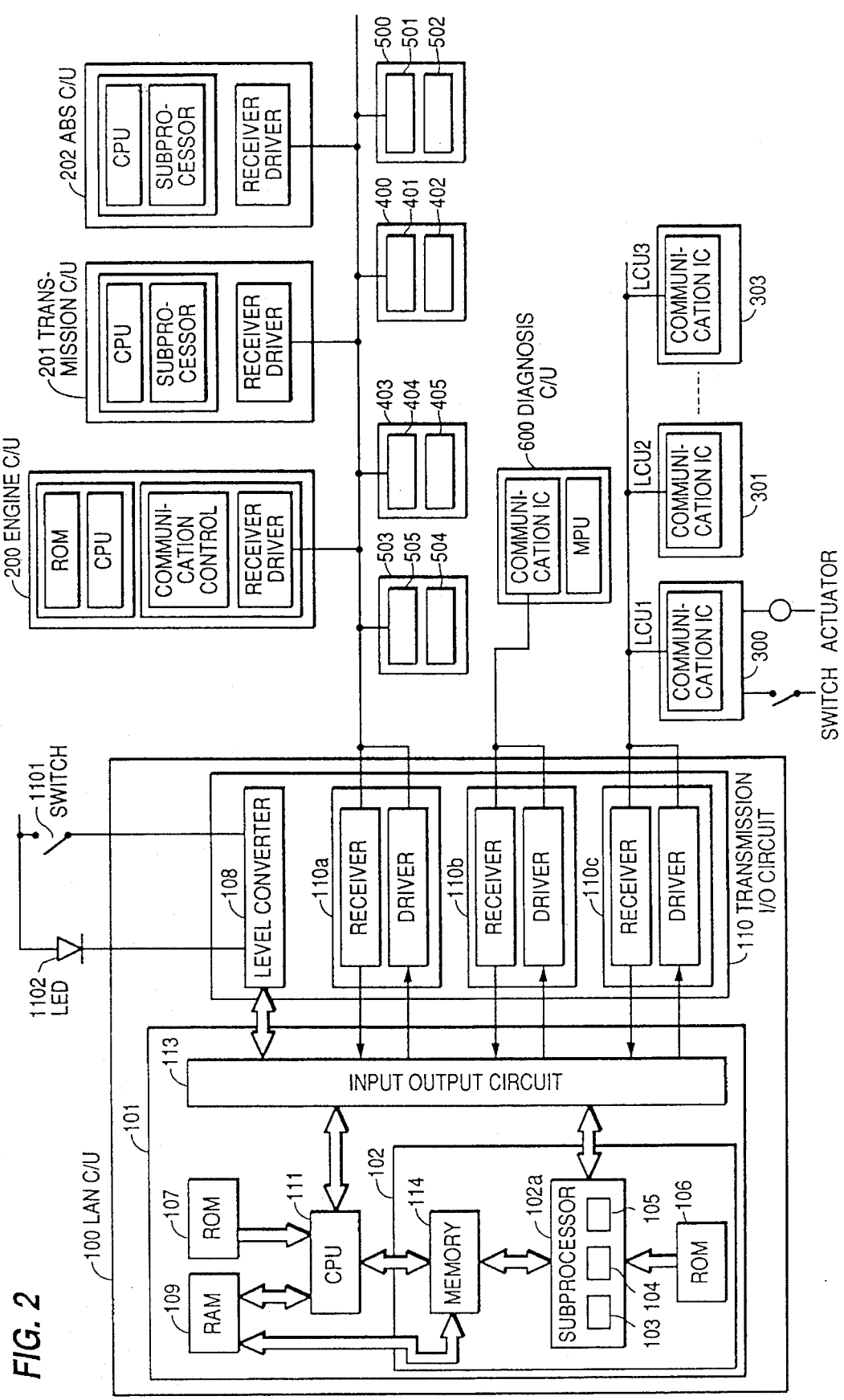
FIG. 2 is a more detailed depiction of the embodiment of FIG. 1.

FIG. 2 is a block diagram of the embodiment of FIG. 1, which shows the configuration of the LANc/u 100 in somewhat greater detail. (Elements of FIG. 2 that correspond to the those FIG. 1 bear the same number.)

The communications unit 102 comprises a subprocessor 102a, which has the three communications interfaces 103–105, and a memory 114, which it shares with CPU 111, and by which it communicates with CPU 111. It also has a read only memory (ROM) 106, which has stored therein a program which controls the operation sequence of the communications unit and its communications interfaces 103–105, in a manner discussed hereinafter.

The central control unit 101 may be, for example, a microprocessor model H8/570, HD 6475708 made by Hitachi, Ltd., which performs computations for Class A, Class B and Class C controls in the CPU 111 and controls the actuators of the control units based on the results in accordance with programs stored in the ROM 107. The CPU 111 can send and receive data to and from the subprocessor 102a through the memory 114, which comprises a general purpose register and a random access memory (RAM). CPU 111 also has its own RAM 109 which is capable of direct data transfer with the communications unit 102.

An input output circuit 113 couples the CPU 111 and the subprocessor 102a to a transmission circuit 110, which has a Class A communications protocol interface 110a, a Class B communications protocol interface 110b and a Class C communications protocol interface 110c for communicating with Class A, Class B and Class C controls respectively. It also includes a level converter 108 which converts the level of switch signals 1101 to the logic level at which the input output circuit 113 can execute logical processing of the signals, by removing surge and spike noises generated in switch 1101, and supplies current to drive indicator 1102 based on the output state of the input output circuit 113.

Figure 3:
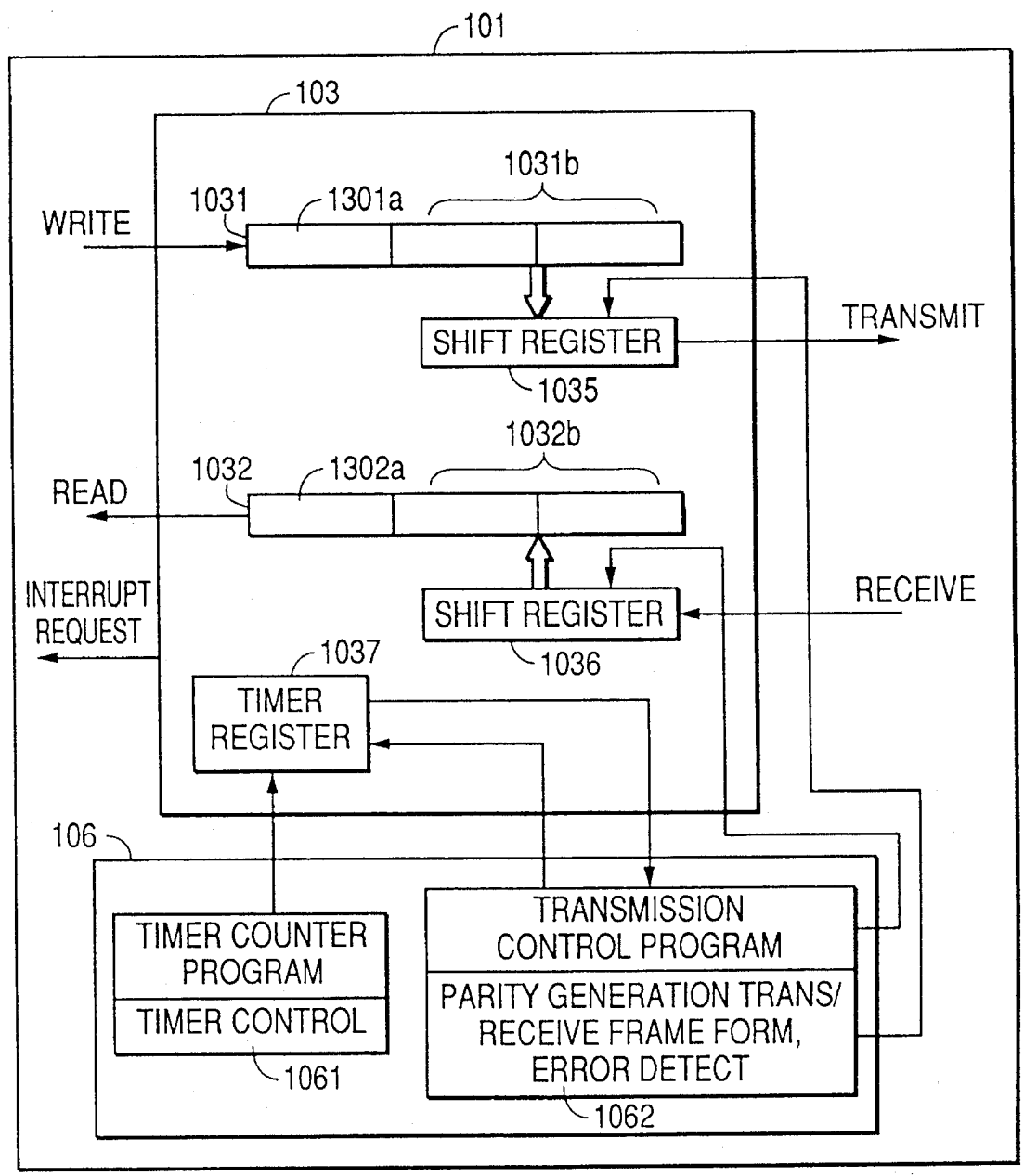
FIG. 3 is a detailed view of the communication protocols of the integrated wiring system of FIG. 1.

In the integrated wiring system according to the invention, the communications unit 102 between the LAN c/u 100 and the respective sensors, controls and actuators is provided in the form of a programmable I/O processor for performing communication control based on the various communication protocols set in the LAN control unit. FIG. 3 shows an arrangement for realizing one communication interface protocol. The communications interface 103 (which is representative of units 104 and 105) has registers 1031 and 1032 for sending and receiving data. Register 1031 has a first portion 1031a for storing address information for control data to be transmitted, as well as a second portion 1031b for storing the control data themselves. Similarly, Register 1032 has a first and second portions 1032a and 1032b for storing the address of a sending unit and for received monitor data, respectively. Shift registers 1035, 1036 serve to send and receive data via a transmission wire to the remote terminals in FIG. 1. A register 1037 serves as a timer counter, which controls operation of the subprocessor 103, in response to data communication processing and timer counting programs 1061 stored in ROM 106, which also includes transmission control programs 1062, discussed later.

Upon initial data receipt, the communications unit 103 detects the transmitted signals at constant intervals and processes the bit values "1" and "0". As data are received, they are entered into the shift register 1036. When receipt of the signal is complete, the address of the sending control unit, together with the monitor data themselves, are transferred and stored in the register 1032. CPU 101 (FIGS. 1, 2) reads these data and writes the address of the control unit to which control data are to be sent, and the control data themselves into register 1031 a and b respectively. The data are then transferred to the shift register 1035, where they are transmitted synchronously under control of the timer counter.

In the present invention, a plurality of the foregoing arrangements are provided in the subprocessor 102, as shown in FIG. 1, so that a plurality of communication protocols can be utilized, while sharing a single processor unit. The operation sequence of the communications interfaces 103–105 as noted above is controlled in the manner described hereinafter in connection with FIGS. 4–5. Computations on the respective transmission control programs are performed by the CPU completely independently so that the transmission control programs are executed by parallel processing.

Figures 4, 5:
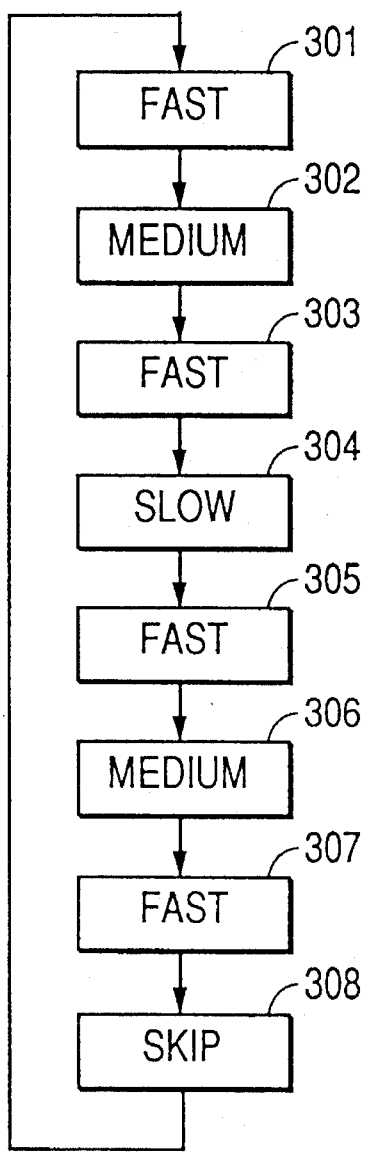
FIG. 4 is a flowchart showing one embodiment of a transmission control program used in the present invention.
FIG. 5 shows a sequence control matrix used in the present invention.

The three transmission control programs are arranged and executed as shown in FIG. 4. The high speed transmission control program is executed every other step, while the medium-speed transmission control program is executed every four steps, and the low-speed transmission control program is executed every eight steps. That is, at step 301, the high-speed transmission control program is executed, followed by the medium-speed transmission control program at step 302. The high-speed program is then run again at step 303 and the low-speed program follows at step 304. At step 305, the high-speed program is performed again, followed this time by the medium speed program once more at step 306. The high speed program is then performed at step 307. At step 308, a cycle is skipped and the process is repeated. In this manner, repetition of each program with the frequency mentioned above is continuously achieved.

Transmission and reception control is executed according to each of the transmission control programs so that the data of a transmitting register is transmitted, while received data is inputted into a shifter 2 and stored in a receiving register, as shown in FIG. 3. The CPU performs reading from and writing to the transmitting and receiving registers.

A sequence control matrix which shows the transmission sequence described in FIG. 4 above, is arranged as shown in FIG. 5. Since the high-speed, medium-speed and low-speed transmission control programs are stored in the ROM 106 of the communications unit 102 the high-speed program is first executed, followed by the medium-speed program. Then, each of the transmission control programs is executed in the order of "high-speed" → "low-speed" →"high-speed" →"medium-speed" →"high-speed" →"nonexecution". The process is then repeated from the first step. In this manner, it is possible to realize the high-speed to low-speed communication protocols with a single communications unit, and since the programs for realizing such communication protocols are stored in the ROM, various communication protocols can be realized.

According to the present invention, in the integrated wiring system, it is possible to efficiently execute data transfers as well as data processing even in the case of terminal processing means having different processing speeds.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Integrated communications apparatus for a vehicle control system having a computational processor for receiving and processing signals indicative of operational status of a plurality of vehicle systems and for controlling said vehicle systems, said apparatus comprising:

a plurality of terminal control units for operating said vehicle systems;

a central control unit having an input-output subprocessor for transferring electronic signals between said computational processor and said terminal control units;

said input-output subprocessor having a plurality of communications interface units for communicating with said terminal control units according to a plurality of communications protocols, each of said communications interface units having a different communications protocol for communicating with particular vehicle systems at a speed which is different from that of others of said communications interface units; and means for alternating operation of said communications interface units according to a predetermined pattern.

2. Apparatus accordingly to claim 1 wherein said plurality of protocols comprise at least a first protocol for transferring signals at a first speed, a second protocol for transferring signals at a second speed and a third protocol for transferring information at a third speed.

3. Apparatus according to claim 2 wherein said first speed is a relatively slower speed, said second speed is greater than said first speed, and said third speed is greater than said second speed.

4. Apparatus according to claim 3 wherein said means for alternating operation comprises a read only memory having said predetermined pattern stored therein.

5. Apparatus according to claim 4 wherein said predetermined pattern provides for operation of said protocol having said third speed at a repetition rate that is greater than that of said protocols having said second and first speeds and for operation of said protocol having said second speed at a repetition rate that is greater than that of said protocol having said first speed.

6. Apparatus according to claim 4 wherein said predetermined pattern provides for operation of said protocols in the following sequence:

third speed second speed third speed first speed third speed second speed third speed pause, which sequence is then repeated.

7. Apparatus according to claim 6 wherein said input-output subprocessor comprises a single communications IC having said plurality of communications interface units included therein.

8. Apparatus according to claim 1 wherein said input-output subprocessor comprises a single communications IC having said plurality of communications interface units included therein.

9. Apparatus according to claim 1 wherein each of a first group of said sensors which communicates at said third speed has a communications IC, and each of said terminal control units associated with said first group of sensors has a computing unit which has a communications interface unit which communicates at said third speed.

10. Method of operating an integrated communications apparatus for a vehicle control system having a computational processor for controlling a plurality of vehicle systems, a plurality of terminal control units for operating said vehicle systems, a plurality of sensors for monitoring operation of said vehicle systems and providing output signals indicative of operational status thereof, and a central control unit having an input-output subprocessor for transferring electronic signals between said computational processor and said sensors and terminal control units, said method comprising the steps of:

providing said input-output subprocessor with a plurality of communications protocols, each of which operates at a speed which is different than a speed of others of said plurality of communication protocols, for communicating with vehicle systems which require different control speeds; and alternating operation of said communications protocols according to a predetermined pattern.

11. Method according to claim 10 wherein a first protocol operates at a first speed which is relatively slower than that of said second and third protocol, a second protocol operates at a second speed which is greater than that of said first protocol and a third protocol operates at a third speed which is greater than that of said first and second protocols, and wherein said predetermined pattern provides for operation of said protocol having said third speed at a repetition rate that is greater than that of said protocol having said second and first speeds and for operation of said protocol having said second speed at a repetition rate that is greater than that of said protocol having said first speed.

12. Method according to claim 11 wherein said predetermined pattern provides for operation of said protocols in the following sequence:

third speed
second speed
third speed
first speed
third speed
second speed
third speed
pause, which sequence is then repeated.

13. Method of operating an integrated communications apparatus for a vehicle control system having a central control unit for controlling a plurality of classes of vehicle systems, each class requiring communication with said central control unit at a speed which is different from that of other classes of said plurality of classes; said method of comprising the steps of:

sequentially operating said central control unit to transmit and receive electronic signals to and from said vehicle systems at each speed required for communication with said plurality of classes of vehicle systems; and controlling said sequence of operating according to a predetermined pattern.

14. Method according to claim 13 wherein said predetermined pattern provides for transmission of signals most frequently at a highest speed and less frequently at lower speeds, with the repetition rate for operation at each speed being proportional to said speed.

15. Method according to claim 14 wherein at least a first class of vehicle systems requires communication at a highest speed, a second class of vehicle systems requires communication at an intermediate speed and a third class of vehicle systems requires communication of at a slowest speed, and wherein said predetermined pattern provides for communication according to the following sequence:

highest speed
intermediate speed
highest speed
slowest speed
highest speed
intermediate speed
highest speed
pause, which sequence is then repeated.

16. Method according to claim 13 wherein at least a first class of vehicle systems requires communication at a highest speed, a second class of vehicle systems requires communication at an intermediate speed and a third class of vehicle systems requires communication of at a slowest speed, and wherein said predetermined pattern provides for communication according to the following sequence:

highest speed
intermediate speed
highest speed
slowest speed
highest speed
intermediate speed
highest speed
pause, which sequence is then repeated.

\* \* \* \* \*